(12) United States Patent
French et al.

(10) Patent No.: US 8,534,345 B1
(45) Date of Patent: Sep. 17, 2013

(54) INSULATED BEVERAGE HOUSING WITH TEMPERATURE MAINTENANCE

(75) Inventors: Marcus French, Rogers, AR (US);
Barbara French, Rogers, AR (US);
Jeffrey Haynes, Leander, TX (US);
Joyce Hurd, West Newbury, MA (US)

(73) Assignee: Koolio, Inc., Rogers, AR (US)

(*) Notice: Subject to any disclaimer, the term of this patent is extended or adjusted under 35 U.S.C. 154(b) by 641 days.

(21) Appl. No.: 12/802,087

(22) Filed: May 28, 2010

(51) Int. Cl.
*A47J 41/00* (2006.01)
*F28D 15/00* (2006.01)

(52) U.S. Cl.
USPC .... 165/10; 165/104.21; 165/136; 220/592.17

(58) Field of Classification Search
USPC ...... 165/10, 46, 104.21, 135, 136; 220/62.11, 220/62.18, 592.17, 592.28
See application file for complete search history.

(56) References Cited

U.S. PATENT DOCUMENTS

| | | | | |
|---|---|---|---|---|
| 1,721,311 A | * | 7/1929 | Muenchen | 215/12.1 |
| 3,205,677 A | * | 9/1965 | Stoner | 62/457.3 |
| 3,463,140 A | * | 8/1969 | Rollor, Jr. | 126/246 |
| 3,766,975 A | * | 10/1973 | Todd | 165/74 |
| 4,183,226 A | | 1/1980 | Moore | 62/457 |
| 4,295,345 A | | 10/1981 | Atkinson | 62/371 |
| 4,324,111 A | * | 4/1982 | Edwards | 62/457.4 |
| 4,344,303 A | | 8/1982 | Kelly, Jr. | 62/530 |
| 4,357,809 A | | 11/1982 | Held et al. | 62/457 |
| 4,399,668 A | | 8/1983 | Williamson | 62/457 |
| 4,782,670 A | | 11/1988 | Long et al. | 62/457 |
| 4,793,149 A | | 12/1988 | Riche | 62/293 |
| 4,955,516 A | | 9/1990 | Satterfield | 224/35 |
| 5,001,907 A | | 3/1991 | LaCroix et al. | 62/457 |
| 5,109,588 A | | 5/1992 | Hewlett et al. | 29/525.1 |
| 5,243,835 A | * | 9/1993 | Padamsee | 62/457.2 |
| 5,269,368 A | | 12/1993 | Schneider et al. | 165/46 |
| 5,361,604 A | | 11/1994 | Pier et al. | 62/457.4 |
| 5,419,154 A | | 5/1995 | Christoff | 62/457.3 |
| 5,934,100 A | | 8/1999 | Hornick | 62/457.4 |
| 6,082,114 A | | 7/2000 | Leonoff | 62/3.64 |
| 6,094,935 A | | 8/2000 | Stein | 62/457.3 |
| 6,103,280 A | | 8/2000 | Molzahn et al. | 426/109 |
| 6,128,915 A | | 10/2000 | Wagner | 62/457.3 |
| 6,134,894 A | | 10/2000 | Searle et al. | 62/62 |
| 6,182,464 B1 | | 2/2001 | Mamich | 62/316 |
| 6,305,175 B1 | | 10/2001 | Searle et al. | 62/62 |
| 6,412,300 B2 | | 7/2002 | Kaposi | 62/457.3 |
| 6,786,062 B1 | | 9/2004 | Greenberg | 62/457.4 |
| 6,851,276 B2 | | 2/2005 | Perrins | 62/457.5 |
| 7,010,935 B2 | | 3/2006 | Citrynell et al. | 62/457.3 |
| 7,040,115 B1 | | 5/2006 | Lopez et al. | 62/457.2 |
| 7,089,757 B2 | | 8/2006 | Yang | 62/457.4 |
| 7,131,289 B2 | | 11/2006 | Harl et al. | 62/457.2 |
| 2006/0156756 A1 | * | 7/2006 | Becke | 62/457.3 |

* cited by examiner

*Primary Examiner* — Teresa Walberg
(74) *Attorney, Agent, or Firm* — Stephen D. Schrantz; Schrantz Law Firm, PLLC

(57) ABSTRACT

The present invention provides a housing having an aperture adapted to receive a heat transfer unit. The heat transfer unit attaches to the housing and directs a heat transfer sleeve into the housing. The heat transfer sleeve also provides an aperture adapted to receive a beverage. The heat transfer sleeve stores a heat transfer material including but not limited to a fluid, gel, or other substance that can be heated or cooled depending upon the desired effect on the beverage. The removable heat transfer unit releasably attaches to the housing for removal of the unit to heat or cool the heat transfer material for use in affecting the temperature of the beverage.

3 Claims, 15 Drawing Sheets

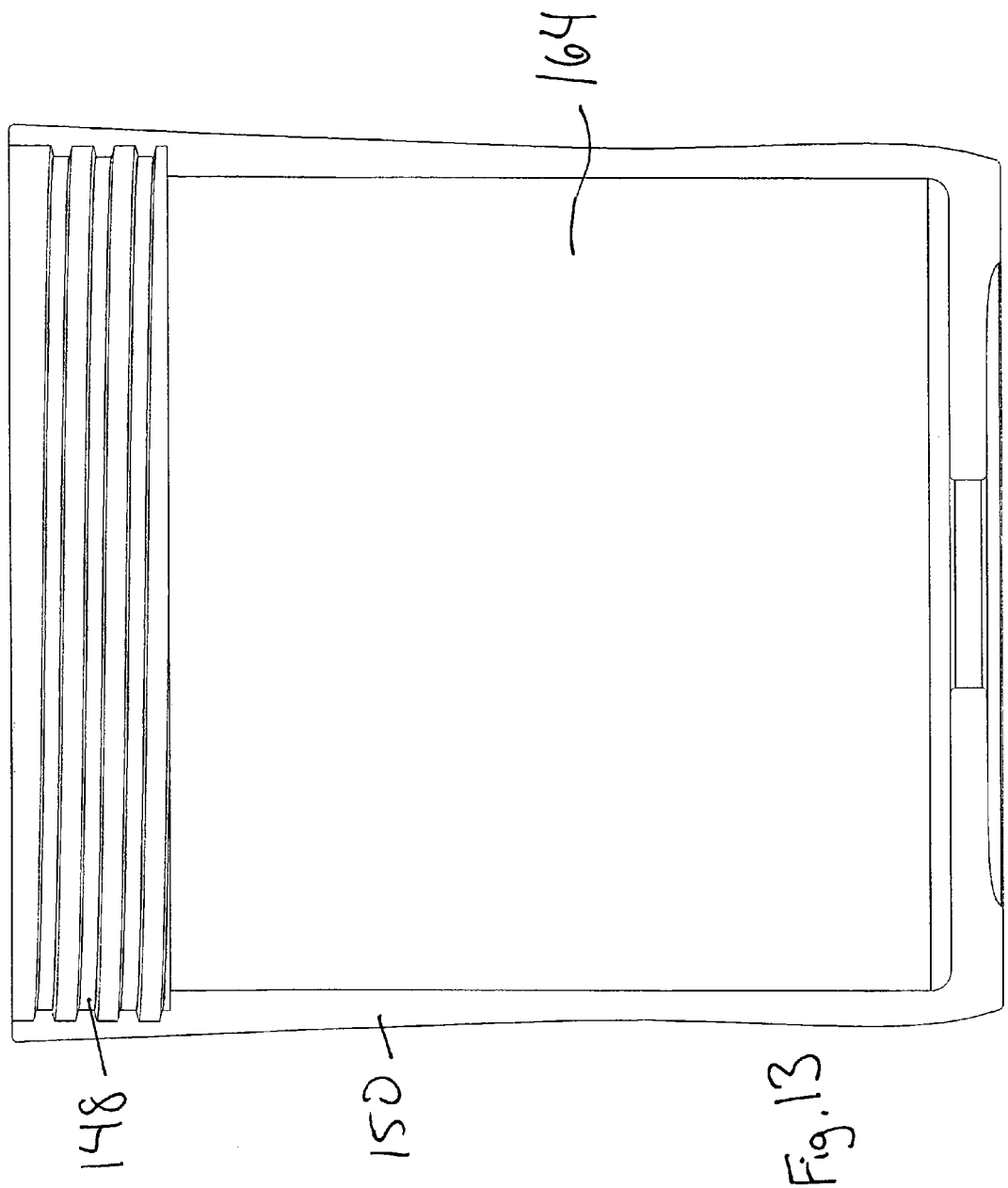

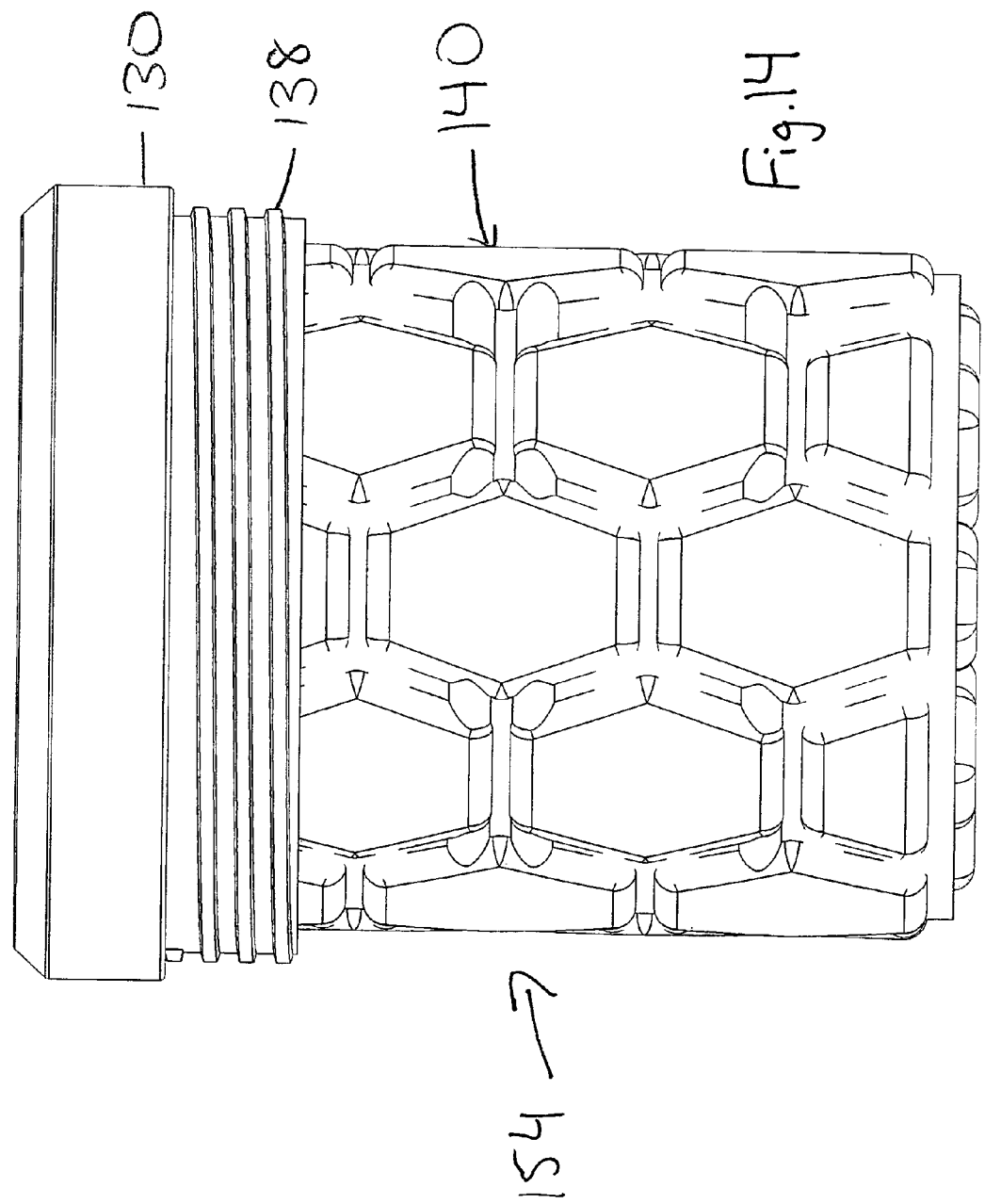

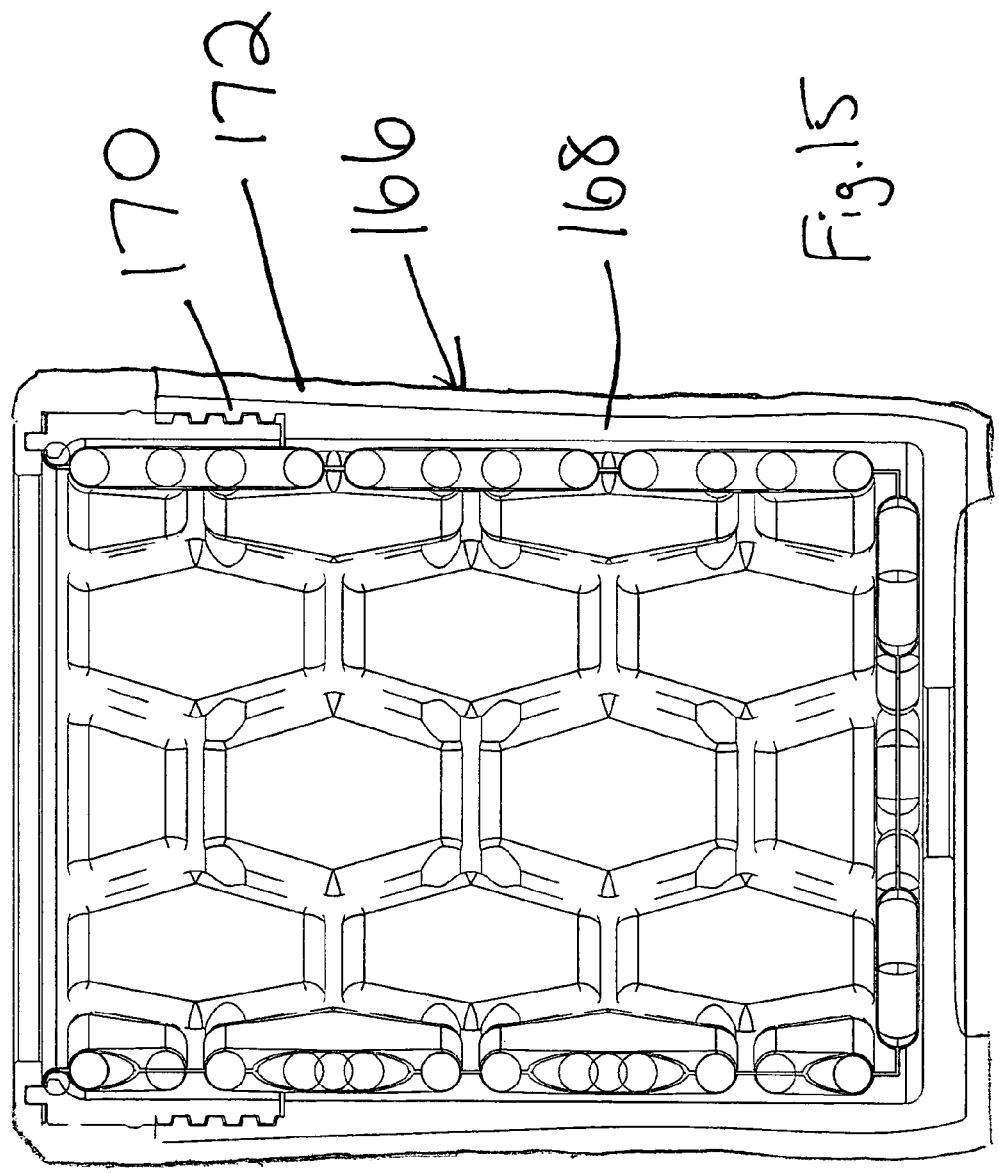

INSULATED BEVERAGE HOUSING WITH TEMPERATURE MAINTENANCE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The invention relates to a beverage holder, and, more particularly, to a beverage holder having a housing, a heat transfer unit disposed within the housing for cooling and/or heating a beverage within the housing. People use insulated beverage holders to provide insulation to a beverage in order to maintain the temperature of the beverage. People either heat or cool their beverages to a desired temperature.

Placing the beverage within an insulated beverage housing insulates the beverage from the environment during consumption of the beverage. One type of insulated beverage holder is constructed from suitable foam configured to receive a beverage can. The foam insulation assists in maintaining the desired condition of the beverage Certain problems exist with the aforesaid prior art beverage holders. The beverage must initially be cooled or heated to the desired temperature. Once the beverage container is removed from its chilled environment the beverage will adjust to the temperature of the environment. The insulated beverage container slows this result. It is an object of the present invention to provide a beverage holder that maintains a proper environment for sustaining the desired temperature of the beverage to allow a user to consume a beverage at the desired temperature over an extended period of time.

II. Description of the Known Art

Patents and patent applications disclosing information relevant to beverage systems are disclosed below. These patents and patent applications are hereby expressly incorporated by reference in their entirety.

U.S. Pat. No. 4,183,226 issued to Moore on Jan. 15, 1980 ("the '226 patent") teaches a means for chilling and insulating a canned or bottled beverage such as beer including a cylindrical sleeve of reusable refrigerant disposed within an insulative beverage can holder and displacing the annular "dead air" cavity between a beverage can situated therein and the side walls of the holder. The lining 24 taught by the '226 patent is formed of thin walled material such as plastic and may be slidably removable from the holder 10.

U.S. Pat. No. 4,782,670 issued to Long on Nov. 8, 1988 ("the '670 patent") teaches an insulated beverage container having both hot and cold retention capabilities designed for the purpose of maintaining, increasing, or decreasing the temperature of the contents in the container. The plastic structure of the container taught by the '670 patent, an insulating sleeve between duel walls of the container, and encapsuled between the dual walls, a thermoplastic gel capable of retaining heat as well as cold, produces a multi-action container which can be heated in a microwave oven, a conventional oven, or can be frozen in a freezer.

U.S. Pat. No. 5,419,154 issued to Christoff on May 30, 1995 ("the '154 patent") teaches a beverage container provided for use with a golf cart or the like having a support member. The container taught by the '154 patent includes a body having a central beverage receiving cavity which extends from the closed bottom of the body to the open top end of the body. The container taught by the '154 patent also includes means for receiving a freezable gel, the means being disposed within the beverage receiving cavity. The '154 patent also teaches a cap that is provided to be releasably attached to the open top end of the body.

The '154 patent teaches that inwardly from the bottom wall 20a is a cavity 122 which in the form of the invention illustrated in FIG. 10 of the drawings, extends across the bottom surface and up along the side walls of the container body 20. This cavity taught by the '154 patent is intended to be filled with a freezable gel 27. The '154 patent teaches that interposed between the walls of the cavity 122 and the exterior wall of the body 20 is an insulator wall 126 which, once the gel is frozen, will maintain that condition for a fixed period of time.

A hollow gel receiving chamber 128d is adapted to be filled with a freezable gel. This gel filled insert may be placed in a freezer apart from the cap 125 and the body 20 to be frozen. After the insert 128 is frozen, it may be matingly threaded into the female boss 126 on the top cap 125. The body 20 is then filled with an appropriate beverage and the top cap installed as previously described.

U.S. Pat. No. 5,269,368 issued to Schneider on Dec. 14, 1993 ("the '368 patent") teaches a reusable cooling and insulating device for bottles and the like that is provided in the form of a jacket having a single or plurality of flexible compartments which are interconnected having an inner chamber and an outer chamber therein. The '368 patent teaches that a heating and cooling temperature conditionable liquid is housed in the inner chamber which enables the inner diameter of the jacket formed by the inner chamber to confirm with the surface of the object on the which the jacket is positioned for heating or cooling. A flexible insulator of air or air and flexible plastic taught by the '368 patent is positioned in the outer chamber of each compartment for directing a greater temperature transfer from liquid to the object and less heat exchange from the liquid to the environment.

U.S. Pat. No. 6,134,894 issued to Searle on Oct. 24, 2000 ("the '894 patent") teaches a container for a beverage that has a conventional external configuration with a cylindrical wall closed by a top member. The '894 patent teaches that the contents of the container can be cooled, heated, or kept hot, or kept cold by the insertion of an insert into the external cavity. To ensure good heat transfer, the insert taught by the '894 patent is push fitted into the external cavity. The insert taught by the '894 patent may be heated or cooled before it is inserted, or it may be actuable to heat up or to cool down.

The can 10 taught by the '894 patent with its contents, but without its insert 30, is stored in a refrigerator, and the insert 30 is kept in a freezer until the material 31 therein is frozen solid. When it is required to use the can 10, the '894 patent teaches that it is removed from the refrigerator and the frozen insert 30 is inserted in its cavity 20. The insulating cap 28 taught by the '894 patent is put in place.

U.S. Pat. No. 6,128,915 issued to Wagner on Oct. 10, 2000 ("the '915 patent") teaches a portable food and beverage cooling device that includes a flexible cooling pouch having outer and inner faces. A cooling pack taught by the '915 patent is provided in the cooling pouch. A flexible insulating panel taught by the '915 patent is provided in the cooling pouch. The '915 patent teaches that the insulating panel has a central region interposed between the outer face of the cooling pouch and the cooling pack. Before use, the invention taught by the '915 patent is stored in a freezer to allow the coolant cells to freeze and be ready for use at a moments notice.

U.S. Pat. No. 6,094,935 issued to Stein on Aug. 1, 2000 ("the '935 patent") teaches a drinking container having a removable, freezable member. The drinking container taught by the '935 patent has a cylindrical inner receptacle and a surrounding cylindrical outer receptacle. The '935 patent teaches an annular chamber that is formed between the inner and outer receptacles. A refrigerant member taught by the '935 patent comprising a plastic envelope containing a freezable gel is dimensioned to fit into the annular chamber, and is readily removable therefrom. A cap taught by the '935 patent engages the drinking container to retain the refrigerant member once placed in the annular chamber. The '935 patent teaches that the refrigerant member is preferably an annular sleeve which slips between the inner and outer receptacles, and folds flat for storage and freezing. The '935 patent teaches that the drinking receptacle includes a removable cap which closes only the open chamber which receives the refrigerant member. The cap taught by the '935 patent both retains the refrigerant member, assists in insulating the same, and excludes condensate from the refrigerant chamber.

U.S. Pat. No. 5,361,604 issued to Pier on Nov. 8, 1994 ("the '604 patent") teaches a portable and hand-held beverage chilling device, having water utilized as a coolant that can be frozen between non-permanently sealed walls of the device, that is intended for chilling and subsequent maintenance of a canned or bottled beverage at its coldest liquid state, while providing direct consumption from its container. The beverage cooler taught by the '604 patent features two cylindrical receptacles that are enclosed on one end. These receptacles, called shells, taught by the '604 patent are of different diameter and height such that the inner is placed within the outer and a coolant is contained in the spacial void created.

U.S. Pat. No. 4,793,149 issued to Riche on Dec. 27, 1988 ("the '149 patent") teaches a cooling and insulating holder for a container such as a beverage can or the like that has a plurality of hollow arcuate reservoir pieces which fit together to form a ring with a receiving opening therein to receive the container.

U.S. Pat. No. 4,399,668 issued to Williamson on Aug. 23, 1983 ("the '668 patent") teaches a flexible, multilayer thermal wrap for beverage containers. The wrap taught by the '668 patent has an inner coolant layer for wrapping about the container which conforms to the container's shape and leaves an opening at the container's top to expose the pouring end. The coolant layer taught by the '668 patent is externally surrounded by an insulative layer.

The beverage holder of the present invention is especially adapted for maintaining the desired condition of the beverage for an extended period of time. The present invention overcomes many of the disadvantages of known insulated beverage holders by providing a heat transfer unit therein which cools or heats the beverage.

Therefore, the present invention is needed to improve ability to heat or cool a beverage and to maintain the desired temperature of a beverage. The present invention is also needed to allow a user to replace the heat transfer unit with another heat transfer unit to continue to cool or heat the beverage as desired. The heat transfer unit may be removed from the housing when either heating or cooling the unit to reduce the insulating effect of the housing to reduce the time and energy required to adjust the temperature of the heat transfer unit.

SUMMARY OF THE INVENTION

The present invention provides a housing having an aperture adapted to receive a heat transfer unit. In one embodiment of the present invention, the housing is constructed with an insulated material to improve the functionality of the present invention and to increase the user's comfort. The heat transfer unit is adapted to fit within the aperture of the housing. The heat transfer unit also provides an aperture adapted to receive a beverage. In one embodiment, the heat transfer unit is adapted to receive a beverage container, such as a can, bottle, cup, or glass. A heat transfer sleeve of the heat transfer unit stores a fluid, gel, or other substance that can be heated or cooled depending upon the desired effect on the beverage. In one embodiment, the present invention may be used for cooling a beverage such that the heat transfer sleeve will have a coolant, such as water, a gel, or a chemical that will cause an endothermic reaction. In another embodiment, the present invention may be used for heating a beverage such that the heat transfer will have a heat supplying material or a chemical that will cause an exothermic reaction.

The cap of the present invention releasably attaches to the housing to secure the heat transfer sleeve within the housing. A user can remove the cap to remove a heat transfer sleeve, to replace a heat transfer sleeve, or to insert a heat transfer sleeve to maintain the beverage at the desired temperature.

It is an object of the present invention to alter the temperature of a beverage by either heating or cooling the beverage as desired by the user.

It is another object of the present invention to provide an insulated housing to maintain the temperature of a beverage and to provide an insulated layer between the user's hand and the beverage while the user is holding the beverage.

It is another object of the present invention to provide a heat transfer sleeve that maintains contact with a beverage container to heat or cool the beverage.

It is another object of the present invention to provide a heat transfer unit that can be replaced with a different heat transfer unit to control the temperature of the beverage.

It is another object of the present invention to deter heat transfer to the environment.

It is another object of the present invention to provide a heat transfer sleeve that heats or cools to allow for a wide temperature range to be applied to the beverage.

It is another object of the present invention to provide a reusable heat transfer unit that can placed within a housing.

It is another object of the present invention to provide a heat transfer unit that may be removed from a housing to reduce the insulated effect of the housing when cooling or heating the heat transfer unit to reduce the time and energy required to change the temperature of the heat transfer unit.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 13 is a cross sectional view of a housing of one embodiment of the present invention;

FIG. 14 is a front view of a heat transfer unit of one embodiment of the present invention; and FIG. 15 is a cross sectional view of one embodiment of the present invention.

DETAILED DESCRIPTION

Figure 1:
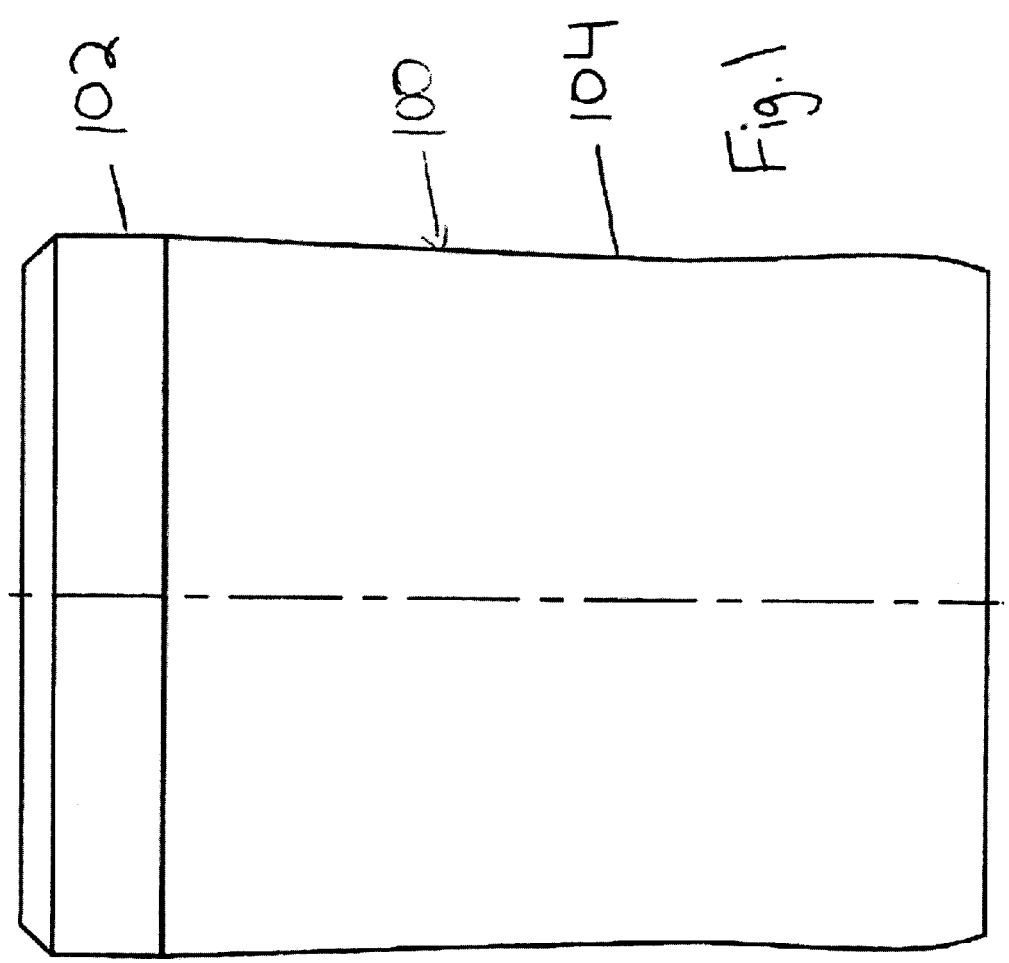
FIG. 1 is a front view of one embodiment of the present invention.

Referring to FIG. 1, the present invention relates to a beverage container for holding a beverage generally shown as 100. A housing 104 of the present invention provides a surface that partially surrounds a beverage. In one embodiment, the housing 104 has a side wall and a bottom wall that retains a beverage within the housing. The bottom wall may be an optional feature of the present invention. The side wall of housing 104 may provide an insulated surface that assists in maintaining the temperature of the beverage. The insulated side wall also limits the heat transfer from the environment and the user to the beverage. The side wall also increases the comfort of the user by limiting the heat or cold transferred to the user's hands to prevent the user's hands from direct contact with the beverage and/or beverage container. The housing 104 may be constructed from rubber, foam, plastic, metal, or other suitable materials. In one embodiment, additional insulation may be provided within housing 104. A sleeve aperture located at the top of the housing 104 allows a heat transfer sleeve to be placed within the housing for transferring heat or cold to either cool or heat the beverage.

The heat transfer unit 101 is a single unit constructed from cap 102, locking body 114, and heat transfer sleeve 110. The heat transfer unit 101 allows installation of the heat transfer sleeve 110 and cap 102 to the housing 150 as a single unit. A user may remove the heat transfer unit 101 to recharge the heat transfer sleeve 110 by either cooling or heating the heat transfer unit 101 depending upon the desired function. Removing housing 104 decreases the time needed to heat or cool the heat transfer unit 101 because of the reduced insulation due to the removal of housing 104 from the heat transfer unit 101. The heat transfer unit 101 attaches to housing 104 to secure the heat transfer sleeve 110 within housing 104.

Cap 102 releasably attaches to housing 104 to maintain a heat transfer sleeve within housing 104. Cap 102 has a beverage aperture adapted to receive a beverage or a beverage container. The beverage container may be a receptacle for holding a beverage, such as a can, bottle, cup, glass, or other type of receptacle capable of holding a beverage. The cap 102 secures the heat transfer sleeve within housing 104.

Figure 2:
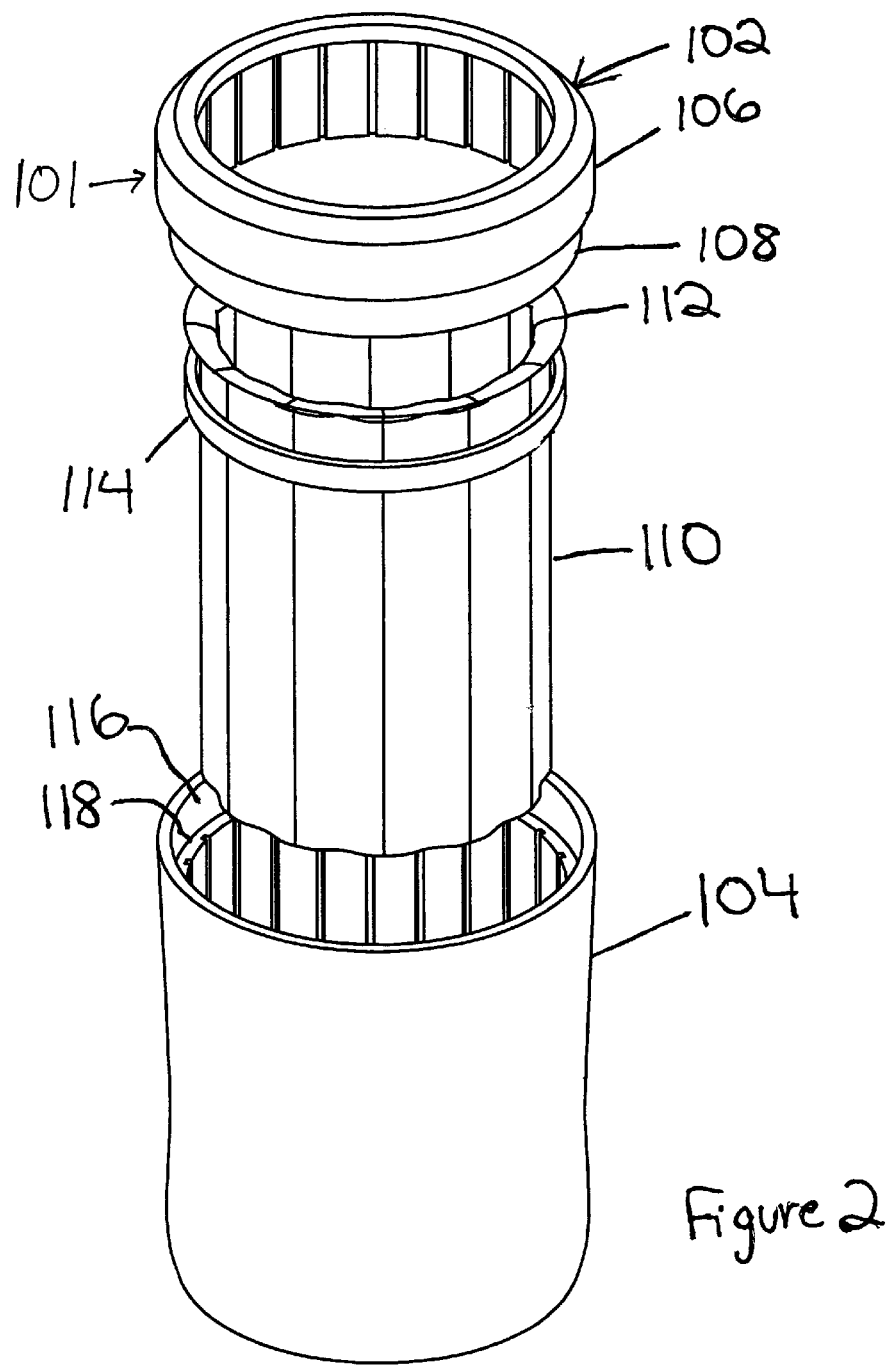
FIG. 2 is an exploded view thereof.

FIG. 2 shows an exploded view of the present invention. Cap 102 attaches with the attachment lip 112 of heat transfer sleeve 110 and locking body 114. Locking body 114 contacts attachment lip 112 of heat transfer sleeve 110 for attachment of heat transfer sleeve 110 to cap 102. In one embodiment, locking body 114 adhesively attaches with cap 102 to attach heat transfer sleeve 110 to cap 102. Locking body 114 may also be mated with cap 102 by a threaded attachment to attach heat transfer sleeve 110 to cap 102. Cap 102 may also be attached by tongue and groove, radio frequency welding, sonic welding, adhesive attachment, or other known methods. In another embodiment, discussed below, mounting heads found on the top of the cap body are positioned within receiving apertures of the heat transfer sleeve. A separate cap head is then attached to secure the heat transfer sleeve to the cap to form the heat transfer unit.

Continuing to refer to FIG. 2, heat transfer sleeve 110 stores a heat transfer material such as fluid, gel, or other substance that can be heated or cooled depending upon the desired effect on the beverage. In one embodiment, the present invention may cool a beverage such that the heat transfer sleeve 110 stores a coolant, including but not limited to a liquid or fluid, such as water, a gel, or a chemical that will cause an endothermic reaction. In another embodiment, the present invention may heat a beverage such that the heat transfer sleeve 110 stores a heat supplying material or a chemical that will cause an exothermic reaction.

In some embodiments, the coolant may have properties such as a low freezing point and/or maintain a cold temperature for an extended period of time. In other embodiments, the heat supplying material may have properties such as a high boiling point and/or maintain a high temperature for an extended period of time. The heat transfer sleeve 110 may also be filled with non-toxic material.

The heat transfer sleeve 110 may be constructed from plastic material including but not limited to a thermoplastic, polyethylene plastic, ethylene vinyl acetate, polypropylene, or polyethylene terephthalate. The heat transfer sleeve 110 may provide pockets adapted to store the heat transfer material. In one embodiment, the heat transfer sleeve 110 provides at least one pocket. In another embodiment, the heat transfer sleeve 110 provides vertical pockets, as shown in FIG. 2. In another embodiment, heat transfer sleeve may provide multiple pockets in a vertical orientation to prevent the heat transfer material from settling in the lower sections of the heat transfer sleeve 110. Other embodiments of the present invention may include a heat transfer sleeve with horizontal pockets, at least one spiral shaped pocket, multiple parallelogram shaped pockets, multiple pockets, or other variations. In another embodiment, the heat transfer sleeve 110 utilizes multiple hexagonal pockets in a honey combed shape. In one embodiment, the heat transfer sleeve has an inner wall and an outer wall that are sealed to store the heat transfer material.

The heat transfer sleeve 110 is preferably constructed from a pair of containment sheets ideally comprising a material that maintains flexibility at below freezing temperatures, such as, for example, a thermoplastic or similar material so that the cooling cavities may be formed by heat sealing, sonic welding, or radio frequency welding of the two containment sheets. Each of the pockets of the heat transfer sleeve has a heat transfer material capable of being cooled or heated. Preferably, each of the pockets is substantially filled with the heat transfer material. Ideally, the cooling substance comprises a freezable gel or liquid, which changes state at 20 to 32 degrees F. While water may be used as the freezable coolant, other substances which have superior cold retention properties are preferred.

Continuing to refer to FIG. 2, the attachment base 108 of cap 102 tapers inward such that the attachment base 108 is found interior of cap body 106 in one embodiment of the present invention. Attachment base 108 is designed to fit within housing 104 to secure cap 102 to housing 104. Attachment base 108 extends into housing 104 when cap 102 releasably attaches to housing 104. Attachment base 108 directs heat transfer sleeve 110 into the interior of housing 104.

In another embodiment, not shown, attachment base 108 extends outward such that attachment base 108 is located exterior of housing 104 when cap 102 releasably attaches to housing 104. In this embodiment, housing 104 directs heat transfer sleeve 110 into housing 104.

The attachment base 108 attaches to retention head 116 to secure cap 102 with housing 104 to maintain heat transfer sleeve 110 within housing 104. In one embodiment, attachment base 108 of cap 102 provides a threaded surface that engages the retention head 116 of housing 104 to secure cap 102 to housing 104. In another embodiment, retention head 116 of housing 104 provides a threaded surface that engages the attachment base 108 of cap 102 to secure housing 104 to cap 102. Other embodiments of the present invention attach the cap to housing though compression fit, a tongue and groove system, and other known releasably attachments.

Figure 3:
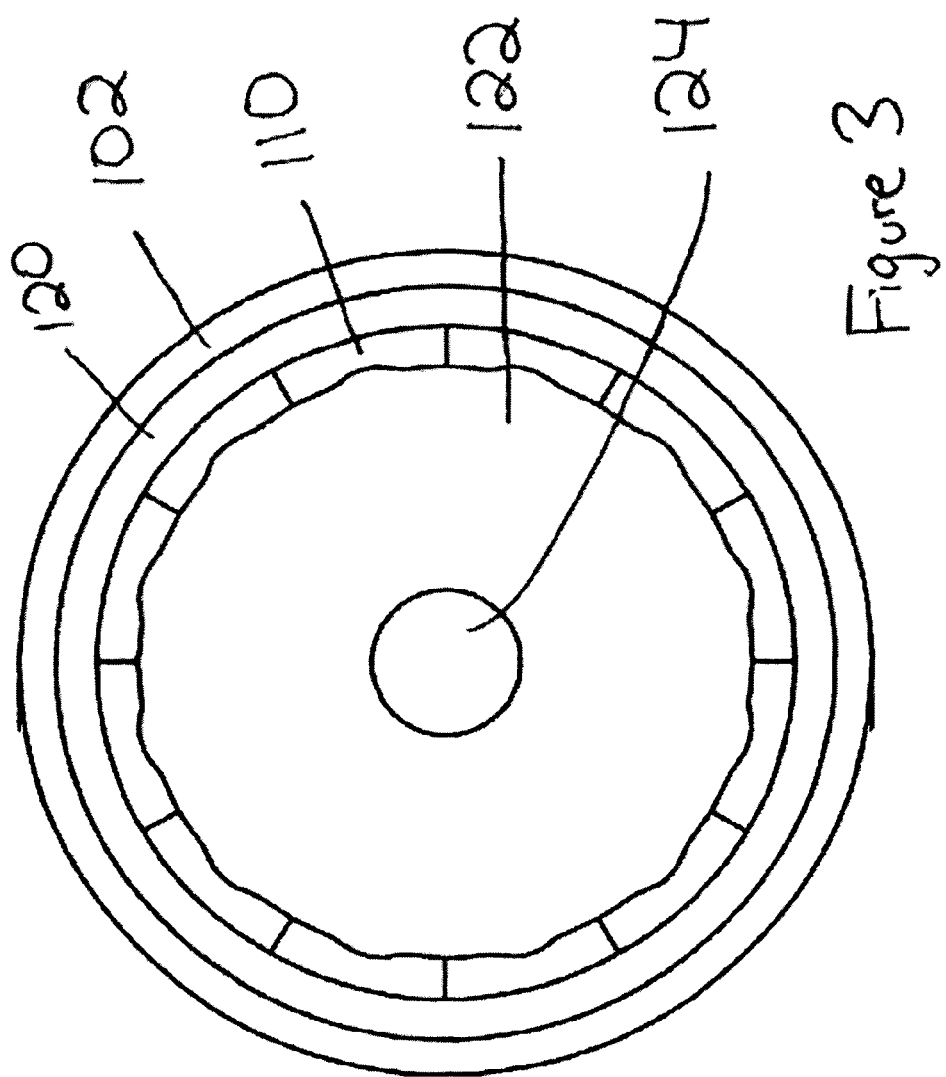
FIG. 3 is a top view thereof.

FIG. 3 shows a top view of the present invention. In this embodiment, cap 102 extends outwards at least as much as housing 104. Cap head 110 tapers inward from cap body 106. Heat transfer sleeve 110 found within housing 104 lines the interior of housing 104 for contact with the beverage and/or beverage container. Heat transfer sleeve 110 forms a receiving aperture 122 within housing 104 adapted to accept a beverage and/or beverage container. The heat transfer sleeve 110 contacts the beverage and/or beverage container to affect the temperature of the beverage. One embodiment of the present invention provides a removal aperture 124 adapted to allow easier insertion and removal of a beverage container into the receiving aperture 122. The removal aperture 124 provides a pathway for removal of trapped gas under the beverage container to ease insertion of the beverage container into housing 104. The removal aperture 124 is large enough to allow a user to insert his finger to adjust the beverage container within housing 104. The removal aperture 124 also allows a user to remove the beverage container out of housing 104 by applying force from the underside of the beverage container. The removal aperture may be optional as some uses of the present invention may not require the removal aperture.

Figure 4:
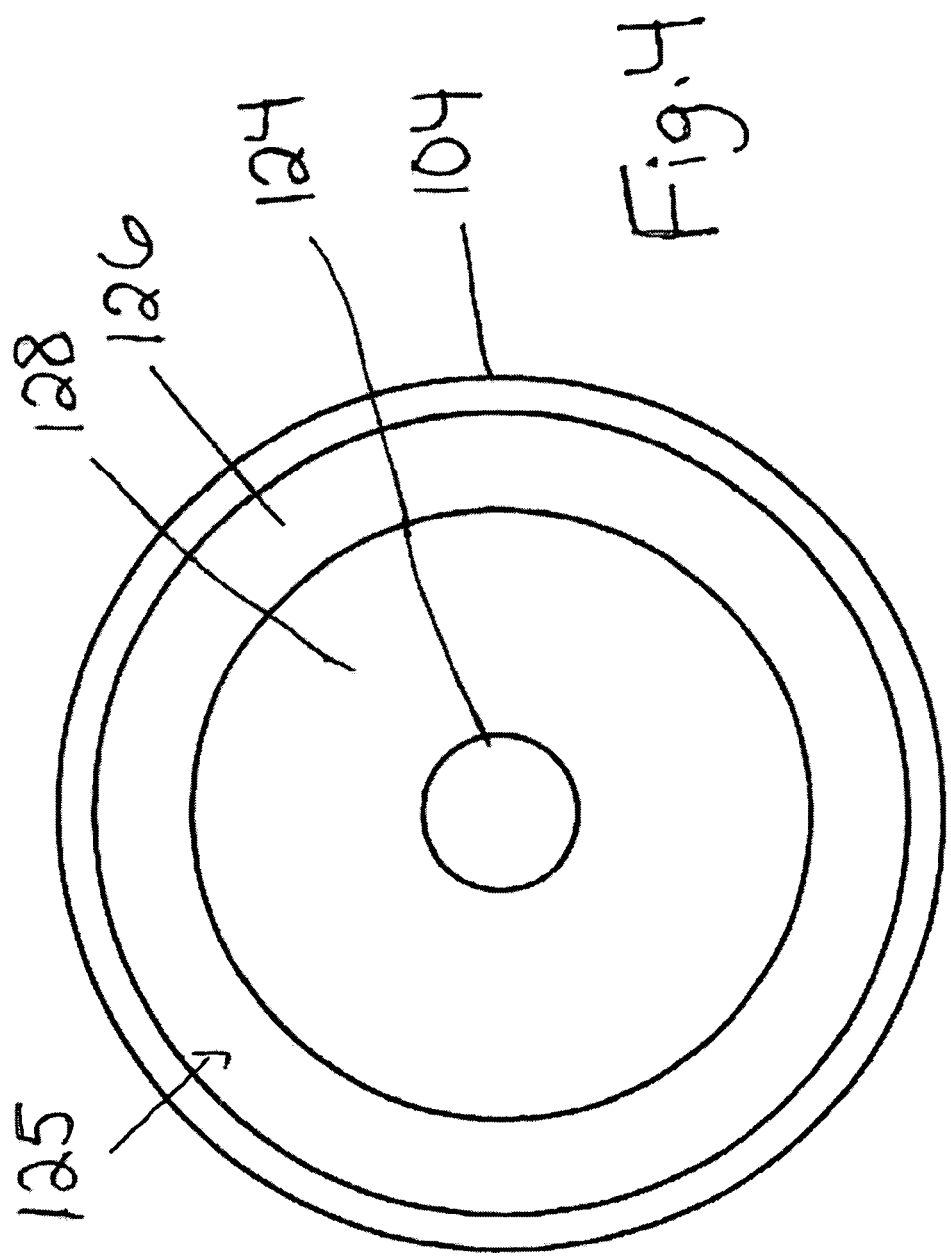
FIG. 4 is a bottom view thereof.

FIG. 4 shows a bottom view of the present invention. The housing bottom 125 provides an inner base 128 and an outer base 126. In one embodiment, inner base 128 extends upward toward receiving aperture 122 to increase a user's access to the underside of a beverage container through removal aperture to simplify removing the beverage container. Outer base 126 balances housing 104 on a support surface. Outer base 126 may be formed as a contiguous part of housing 104 or may be an additional structure formed from a non-skid material such as a thermoplastic elastomer (TPE). In addition, housing bottom 125 provides removal aperture 124 to enable user to remove a beverage container from housing 104.

Figure 5:
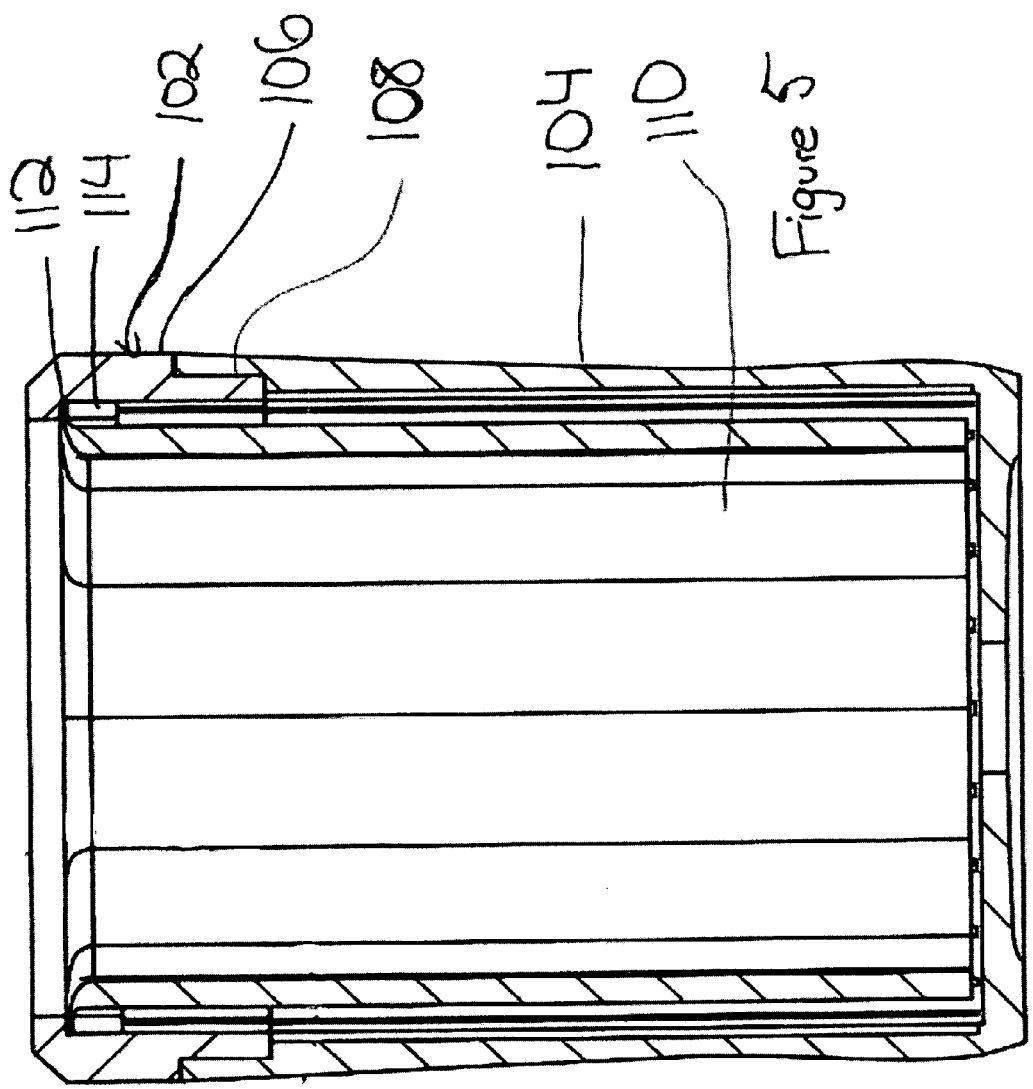
FIG. 5 is a sectional view of one embodiment of the present invention.
Figure 6:
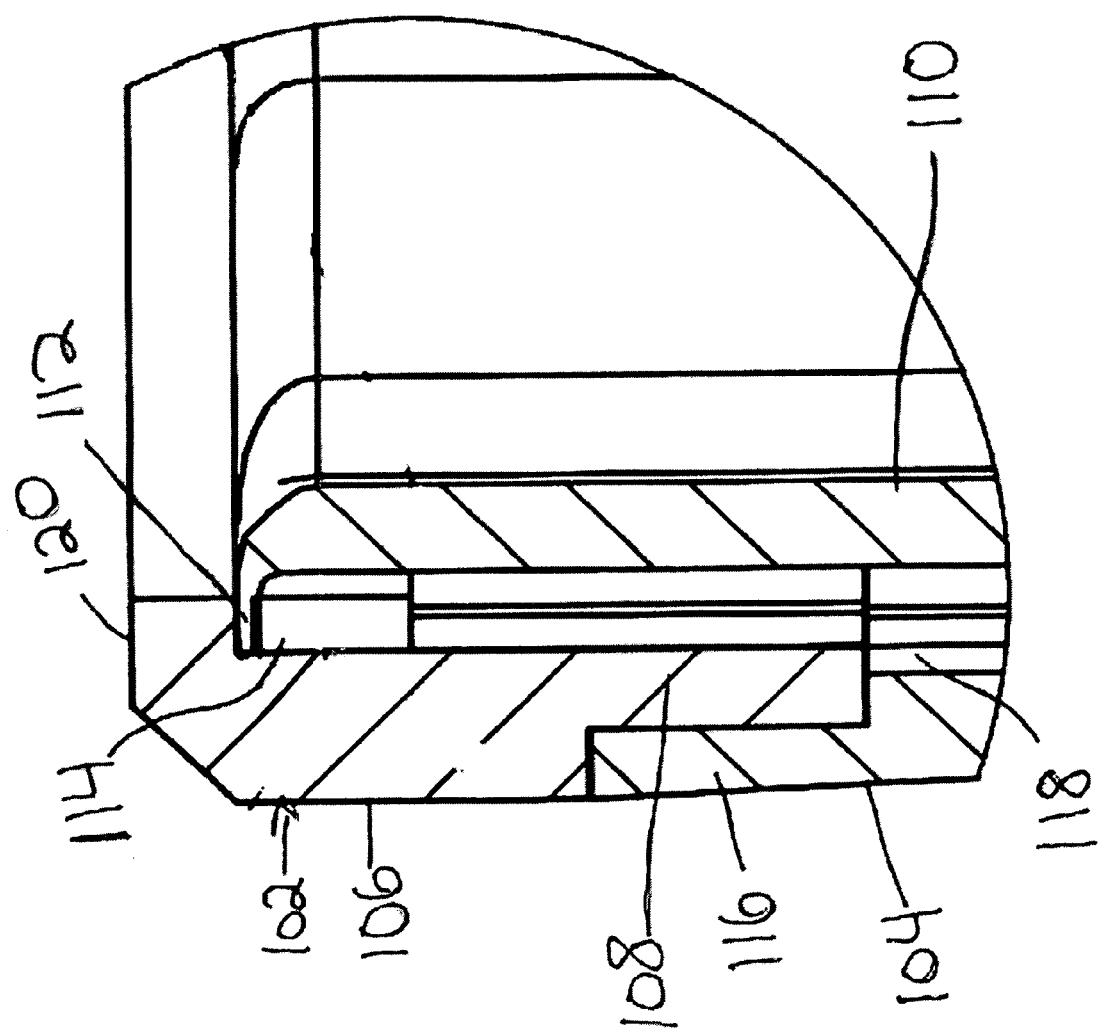
FIG. 6 is a portion of a sectional view thereof.

FIGS. 5 and 6 show a cross section view of the present invention. Cap 102 releasably attaches to housing 104. Attachment base 108 of cap 102 narrows such that attachment base 108 fits within housing 104 for securing cap 102 to housing 104. Heat transfer sleeve 110 lines the interior of housing 104 to either directly or indirectly contact beverage within housing 104 to adjust the temperature of the beverage.

FIG. 6 shows an enlarged view of the attachment of the cap 102 to housing 104 and fastening of the heat transfer sleeve 110 to the cap 102. Attachment lip 112 is secured between cap head 120 and locking body 114. In one embodiment of the present invention, luting may be found below the attachment of locking body 114. Attachment base 108 of the cap 102 extends inward from cap body 106 to allow the exterior of cap body 106 to be flush with the exterior of housing 104. Attachment base 108 is sized to fit inside of housing 104. Attachment base 108 is threaded to attach the threaded portion of retention head 116. Housing 104 secures attachment base 108 such that attachment base 108 is stored essentially flush with retention neck 118 of housing 104. As noted above, the cap may be attached to the housing by other known methods including but not limited to compression fit, tongue and groove, and other known attachment methods.

Figure 7:
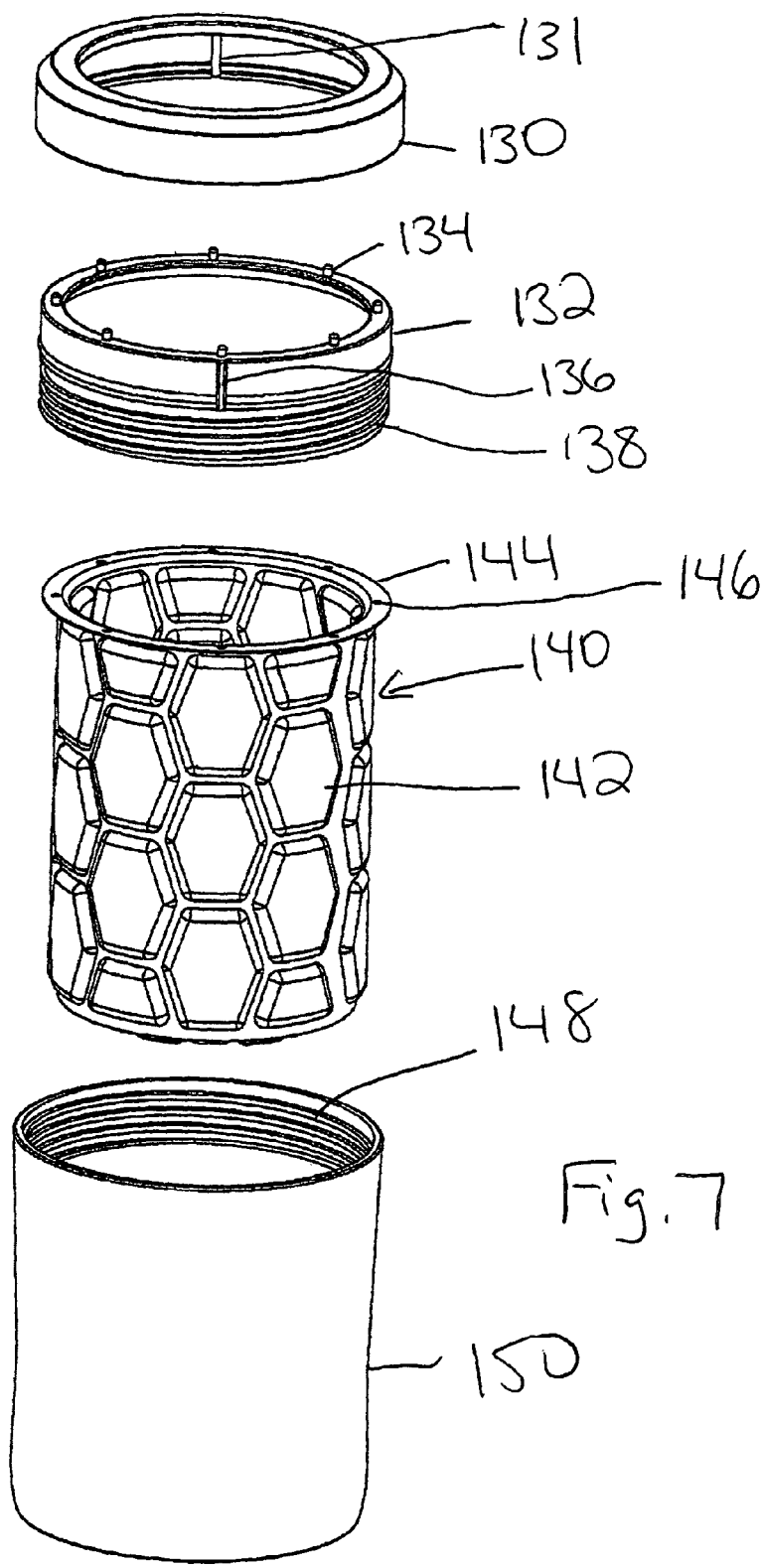
FIG. 7 is an exploded view of another embodiment of the present invention.
Figure 8:
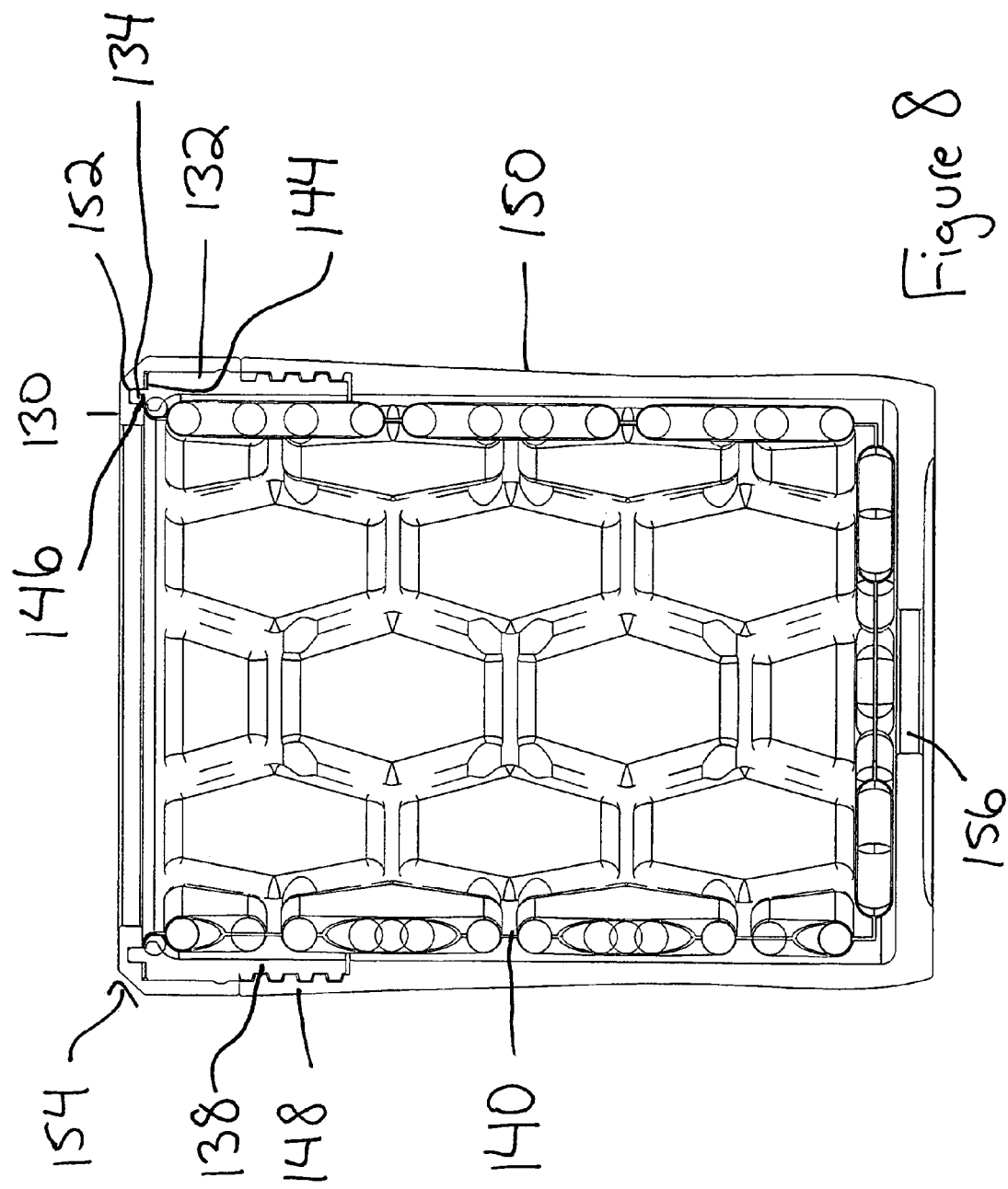
FIG. 8 is a cross sectional view thereof.
Figure 10:
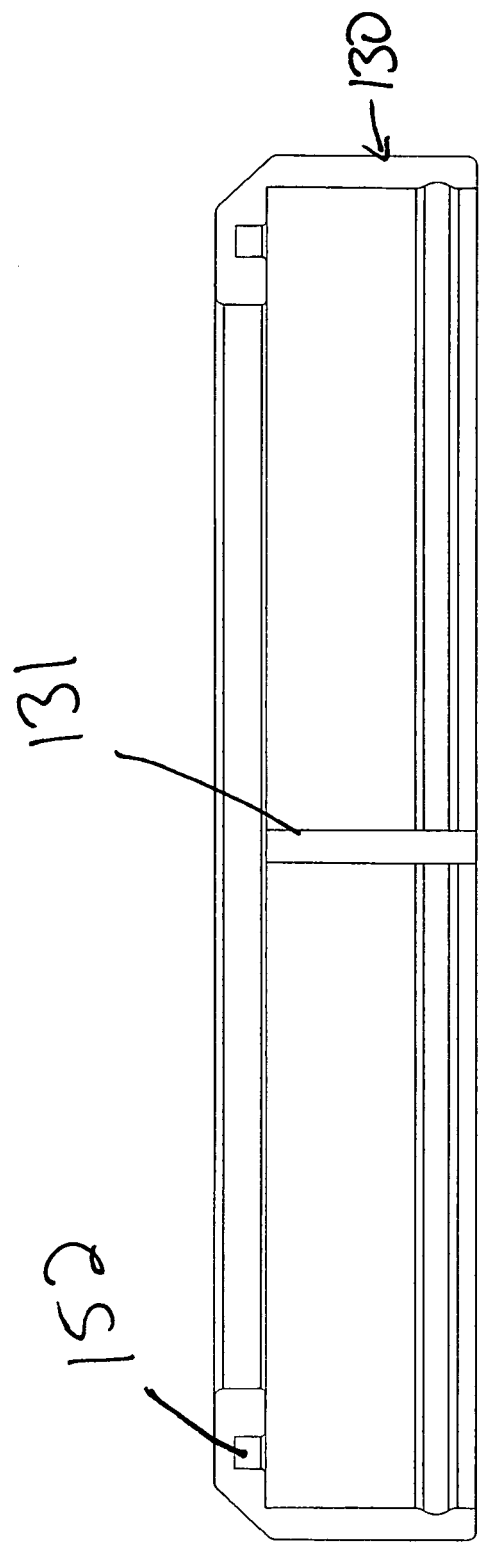
FIG. 10 is a cross sectional view of a cap head of one embodiment of the present invention.
Figure 12:
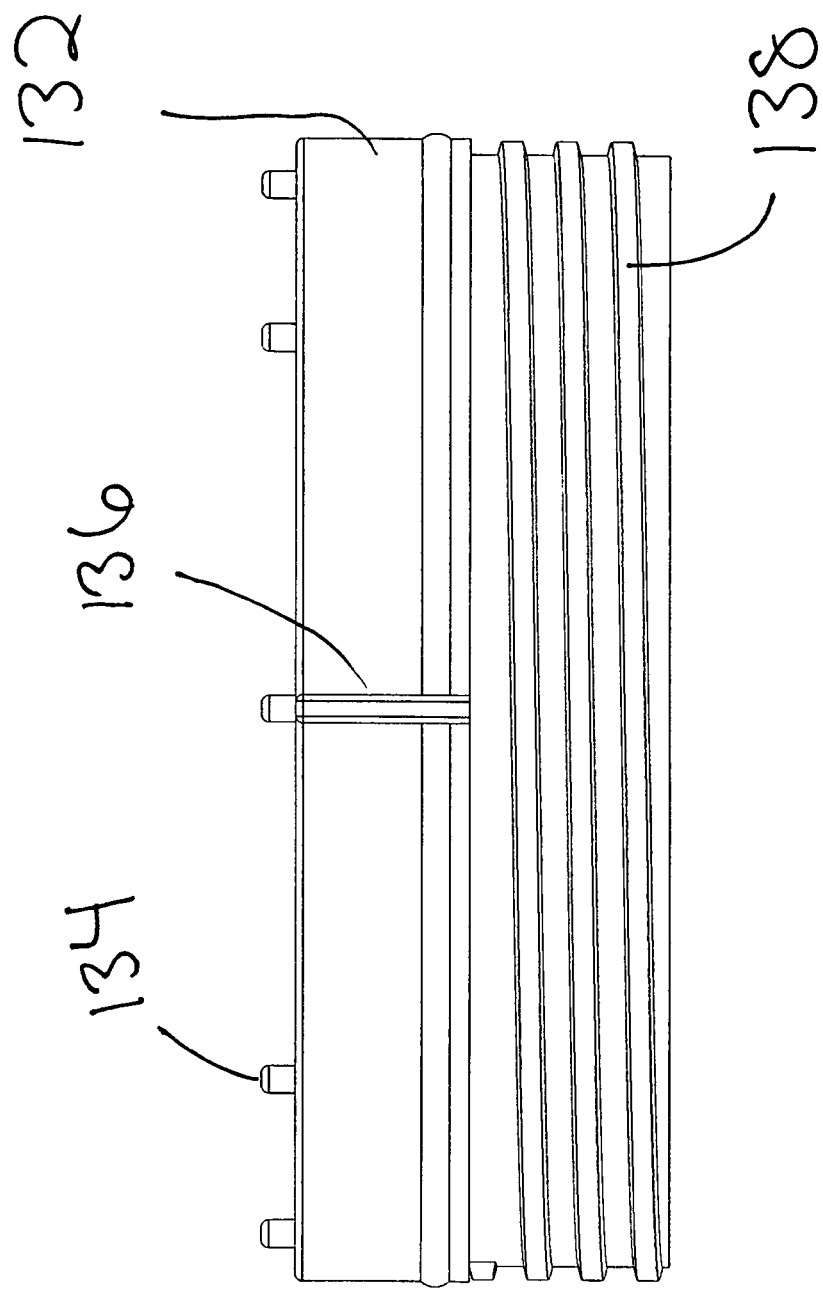
FIG. 12 is a cross sectional view of a cap body of one embodiment of the present invention.

FIGS. 7 and 8 show another embodiment of the present invention. Cap head 130, shown in FIG. 10, attaches to cap body 132 to form a cap. Cap head 130 attaches to cap body 132 such that cap head 130 will rotate with cap body 132 during rotation. To secure cap head 130 with cap body 132, attachment finger 136 inserts into attachment aperture 131 to allow for rotation of cap head 130 with cap body 132. FIG. 12 shows one embodiment of the cap body 132. Mounting heads 134 of cap body 132 further secure cap body 132 to cap head 130. Mounting heads 134 protrude upwards to be inserted into mounting apertures found on the underside of cap head 130. The mounting heads 134 extend upwards into the mounting apertures. In another embodiment, the attachment finger may be located on the cap head and the attachment aperture may be located on the cap body. Likewise, the mounting heads may be placed on the cap head and the mounting apertures may be placed on the cap body.

Mounting heads 134 also extend upwards to secure the heat transfer sleeve 140 to cap. Heat transfer sleeve 140 provides an attachment lip 144 with attachment apertures 146. The attachment lip 144 protrudes outward laterally to extend outward from heat transfer sleeve 140. Because attachment lip 144 extends outward, heat transfer sleeve 140 inserts into cap body 132 to allow heat transfer sleeve 140 to be placed within housing 150. As shown in FIG. 8, attachment lip extends outwards above the top of cap body 132 for insertion of mounting heads 134 through the attachment apertures 146. The mounting heads 134 pass through attachment apertures 146 before being inserted into the mounting apertures 152 of cap head 130 to secure the attachment lip 144 between the top of body 132 and the interior of cap head 130. The cap body 132 and cap head 130 attach to each other to form the cap with the heat transfer sleeve 140 secured within. In one embodiment, cap body 132 may be attached to the cap head 130 by attachment methods including but not limited to adhesive attachment, threaded attachment, tongue and groove attachment, sonic welding, radio frequency welding, or applied adhesive.

The cap head 130, cap body 132 and heat transfer sleeve 140 secure to one another to form a heat transfer unit 154, a cooling unit or a heating unit, depending upon the function desired by the user as shown in FIG. 14. FIG. 8 shows the attachment of the heat transfer unit 154. The heat transfer unit 154 is a single unit that may be installed and removed from the housing 150. A user may remove the heat transfer unit 154 to recharge the heat transfer sleeve 140 by either cooling or heating the heat transfer unit 154 depending upon the desired function. Removing housing 150 decreases the time needed to heat or cool the transfer unit because of the reduced insulation due to the removal of housing 150 from the heat transfer unit 154. The heat transfer unit 154 attaches to housing 150 to secure the heat transfer sleeve 140 within housing 150. Attachment base 138 provides a threaded surface to engage a threaded surface of retention head 148. The threaded connections of the attachment base 138 and retention head 148 secure the cap to the housing 150. The threaded attachment may be a regular threaded connection or a reversed threaded connection. As noted above, other methods of attachment of the cap to the housing may be utilized including but not limited to compression fit, tongue and groove, a releasable attachments, and other methods of attachment.

Figure 11:
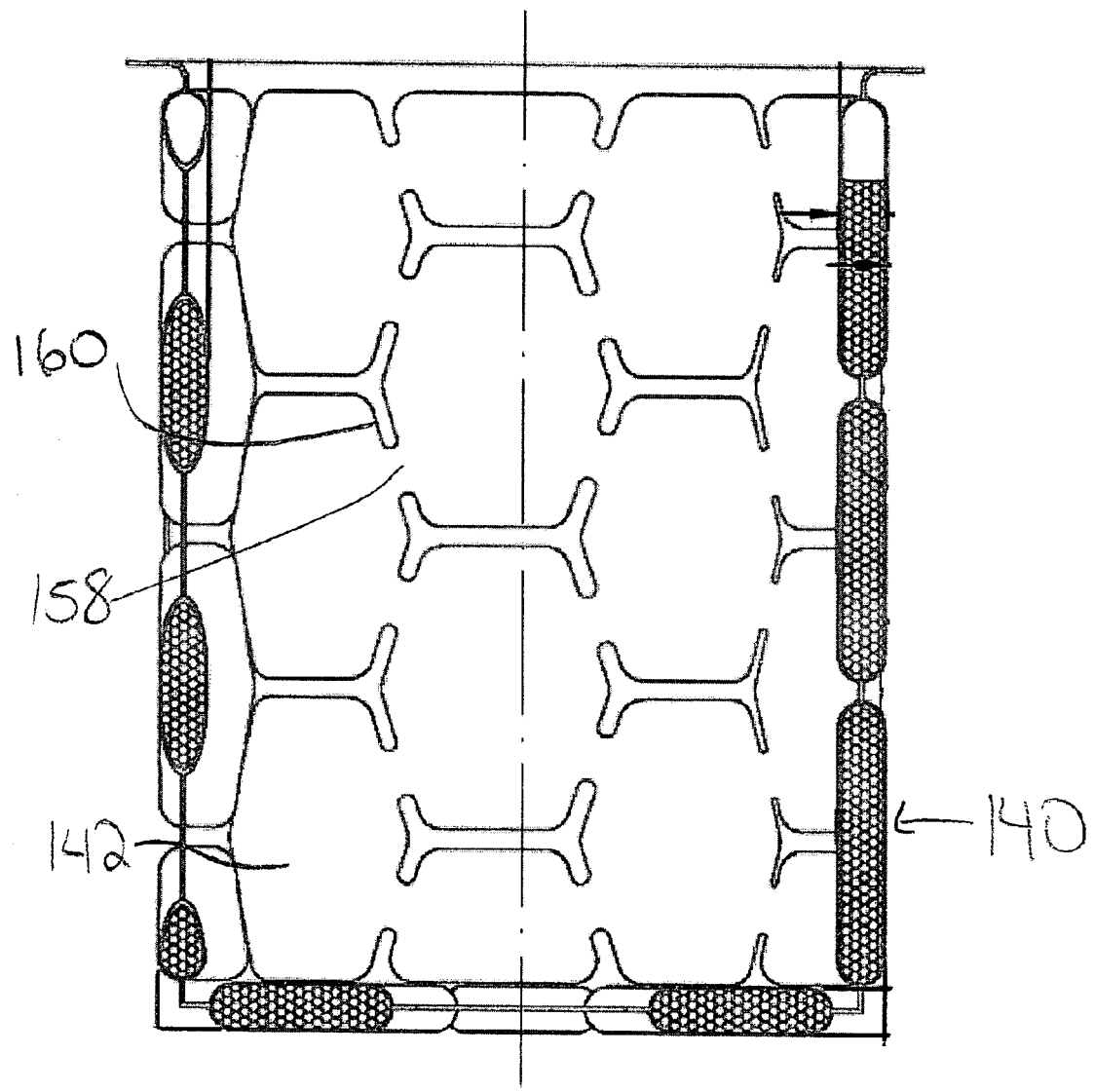
FIG. 11 is a cross sectional view of a heat transfer sleeve of one embodiment of the present invention.

Continuing to refer to FIGS. 8 and 11, the pockets 142 store the heat transfer material including but not limited to a liquid, a gel, water or other substance that can be heated or cooled depending upon the desired effect on the beverage. In one embodiment, pocket walls 160 form each pocket 142. Other embodiments of the present invention may include a heat transfer sleeve with vertical pockets, horizontal pockets, at least one spiral shaped pocket, multiple parallelogram shaped pockets, multiple pockets, or other variations. The pocket walls may be formed by attachment of the inner wall and outer wall of the heat transfer sleeve. The pocket walls 160 retain an amount of the heat transfer material within each pocket 142. Pocket apertures 158 allow the heat transfer material to flow from pocket 142 to pocket 142. The pockets 142 formed by the pocket walls 160 decrease production costs and reduce production time due to the ease of filling each heat transfer sleeve 140. The multiple pockets also allow for uniform distribution of the heat transfer material through the heat transfer sleeve.

Figure 9:
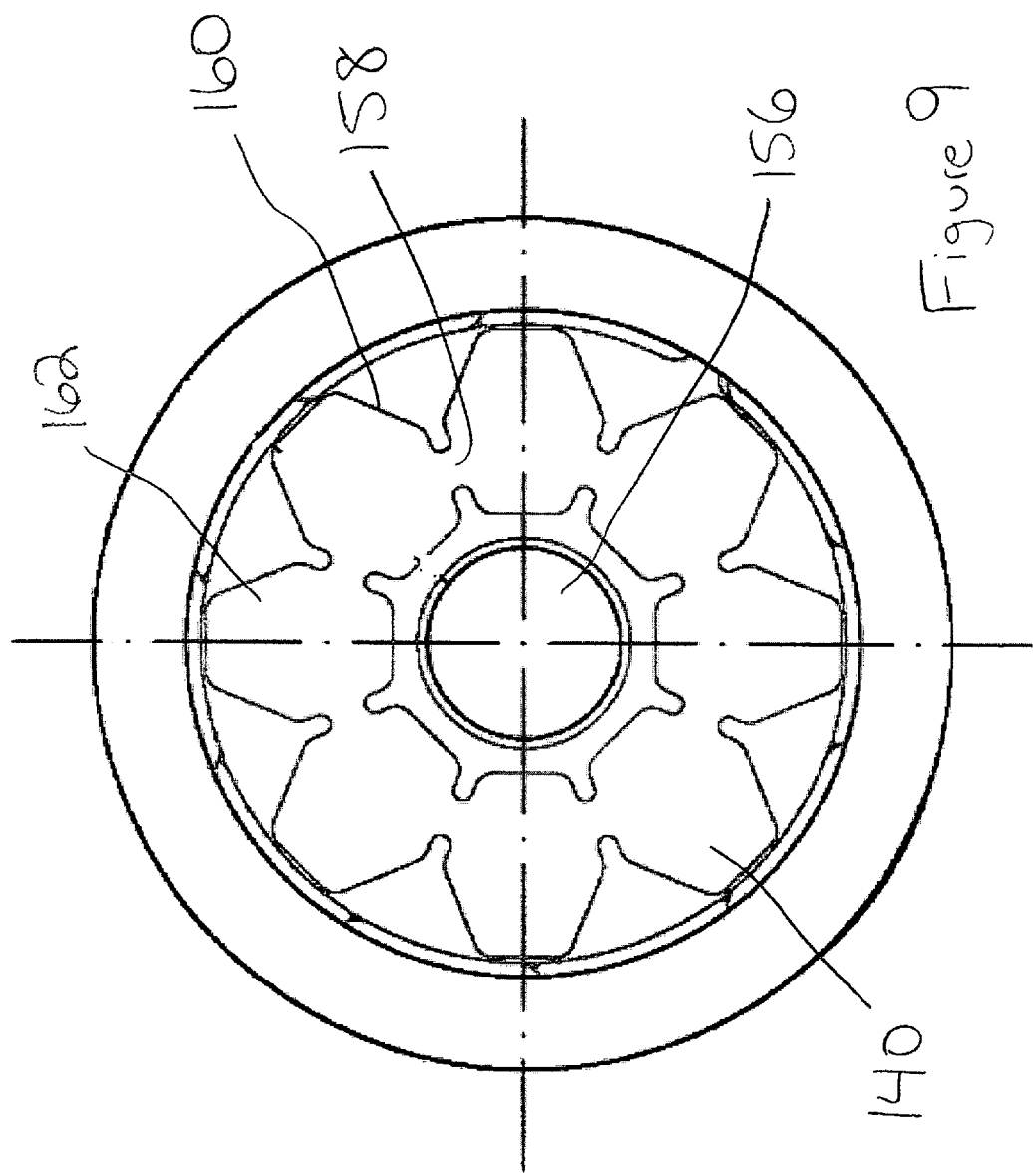
FIG. 9 is a top cross sectional view thereof.

FIG. 9 shows the attachment of cap head 130 and cap body 132. Attachment finger 136 inserts into attachment aperture 131. The insertion of attachment finger 136 into attachment aperture 131 allows cap head 130 to rotate with cap body 132 when the two are combined to form the cap. FIG. 9 also shows the bottom of the heat transfer sleeve 140. Bottom pockets 162 are also formed by pocket walls 160. However, the bottom pockets 162 have pocket apertures 158 between the two adjacent bottom pockets 162. The pocket apertures 158 between the bottom pockets 162 allow the heat transfer material to flow between each bottom pocket 162. In another embodiment, the heat transfer sleeve does not have bottom pockets such that the bottom of the heat transfer sleeve is open.

FIG. 13 shows a cross sectional view of housing 150. Housing 150 provides a receiving aperture 164 that stores a portion of the heat transfer sleeve 140. Retention head 148 provides a threaded surface of housing 150 for attachment of the heat transfer unit 154 to housing 150. FIG. 15 shows another embodiment of housing 166 that provides a metal interior 168. The retention head 170 is also constructed from metal. The metal interior is coated with an insulating surface 170 constructed from foam, EVA foam, or other insulating material such as silicone, polyurethane, or ceramic materials.

The housing may be constructed from a semi-rigid including but not limited to EVA plastic, and compression molded foam. The housing may also be constructed from a rigid material such as metal or stainless steel covered in foam, EVA foam, or other insulating material such as silicone, polyurethane, or ceramic materials. Other embodiments do not cover the housing with the foam, EVA foam, or other insulating material. In another embodiment, the threaded portions of the invention such as the retention head and the attachment base may be constructed from a rigid material such as a plastic, metal, or stainless steel. In one embodiment of the present invention, the inner wall, outer wall, or both the inner wall and the outer wall of the heat transfer sleeve may be lined with nylon, polyester, or suede to simplify the process of inserting and removing the beverage container and/or the heat transfer unit.

The present invention provides multiple sized heat transfer units and housings capable of storing different types of beverage containers, including but not limited to cans, bottles, sport bottles, wine bottles of different sizes, cups, glasses, and other types of beverage containers.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for adjusting the temperature of a beverage stored in a beverage container comprising:
   a housing adapted to receive the beverage container;
   a heat transfer unit releasably attachable to the housing;
   a heat transfer sleeve of the heat transfer unit, the heat transfer sleeve adapted to receive the beverage container, the heat transfer sleeve having at least one pocket, the pocket storing a heat transfer material; and
   the heat transfer sleeve releasably attaches to the housing, at least a portion of the heat transfer sleeve stored within the housing when the heat transfer unit is attached to the housing;
   a cap secured to the heat transfer sleeve;
   the cap adapted to releasably attach to the housing to releasably attach the heat transfer unit to the housing;
   an attachment lip of the heat transfer sleeve, the attachment lip protruding externally outward from the heat transfer sleeve, the attachment lip providing a surface for attaching the heat transfer sleeve to the cap;
   a cap head of the cap, the cap head adapted to secure the attachment lip of the heat transfer sleeve;
   a cap body adapted to secure the attachment lip of the heat transfer unit;
   at least one mounting head located on the top of the cap body;
   at least one mounting aperture located on the underside of the cap head, the mounting aperture adapted to accept the mounting head located on the top of the cap body; and
   a receiving aperture located on the attachment lip, the receiving aperture of the attachment lip adapted to receive the mounting head, the mounting head inserted through the receiving aperture of the attachment lip, the mounting head positioned within the mounting aperture for securing the heat transfer sleeve to the cap.

2. The apparatus of claim 1, the cap further comprising:
an attachment aperture of the cap head extending vertically along the interior of the cap head, and
an attachment finger of the cap body extending vertically along the exterior of the cap body, the attachment finger of the cap body adapted to be inserted into the attachment aperture of the cap head, the attachment finger of the cap body and attachment aperture of the cap head assisting the rotation of the cap body with the rotation of the cap head.

3. An apparatus for adjusting the temperature of a beverage stored in a beverage container comprising:
a housing adapted to receive the beverage container;
a heat transfer unit releasably attachable to the housing;
a heat transfer sleeve of the heat transfer unit, the heat transfer sleeve adapted to receive the beverage container, the heat transfer sleeve having at least one pocket, the pocket storing a heat transfer material;
the heat transfer sleeve releasably attachable to the housing, at least a portion of the heat transfer sleeve stored within the housing when the heat transfer unit is attached to the housing;
a receiving aperture located in the top of the housing adapted to receive at least a portion of the heat transfer sleeve;
a receiving aperture located in the top of the heat transfer sleeve adapted to receive the beverage container;
a side wall adapted to at least partially enclose the side of the beverage container;
a cap secured to the heat transfer sleeve;
the cap adapted to releasably attach to the housing to releasably attach the heat transfer unit to the housing;
wherein the cap is fixedly attached to the heat transfer sleeve;
at least one mounting head located on the top of the cap body;
at least one mounting aperture located on the underside of the cap head, the mounting aperture adapted to accept the mounting head located on the top of the cap body; and
a receiving aperture located on the attachment lip, the receiving aperture of the attachment lip adapted to receive the mounting head, the mounting head inserted through the receiving aperture of the attachment lip, the mounting head positioned within the mounting aperture for securing the heat transfer sleeve to the cap.

* * * * *